United States Patent
Gustafsson

[11] 3,938,025
[45] Feb. 10, 1976

[54] DC TO DC CONVERTER FOR PRODUCING TWO INDIVIDUALLY CONTROLLED AND STABILIZED DC-VOLTAGES

[75] Inventor: Rolf Erik Olof Gustafsson, Huddinge, Sweden

[73] Assignee: Telefonaktiebolaget L M Ericsson, Stockholm, Sweden

[22] Filed: Oct. 2, 1974

[21] Appl. No.: 511,209

[30] Foreign Application Priority Data
Oct. 17, 1973 Sweden ................................ 140923

[52] U.S. Cl. ............................ 321/2; 307/4; 307/45; 307/55; 321/45 R; 331/113 R
[51] Int. Cl.² ......................................... H02M 3/335
[58] Field of Search ............... 307/4, 43, 45, 46, 53, 307/55; 321/2, 27 R, 45 R; 331/60, 61, 113, 114

[56] References Cited
UNITED STATES PATENTS

| | | |
|---|---|---|
| 3,117,289 | 1/1964 | Grandstaff et al. ............. 331/113 A |
| 3,230,467 | 1/1966 | Atherton et al. ................. 307/55 X |
| 3,297,960 | 1/1967 | Massey ........................... 331/113 A |
| 3,539,905 | 11/1970 | Schwarz ....................... 331/113 A X |
| 3,704,381 | 11/1972 | Nercessian .......................... 307/53 |

FOREIGN PATENTS OR APPLICATIONS

1,188,117    4/1970    United Kingdom .............. 321/27 R

Primary Examiner—William M. Shoop
Attorney, Agent, or Firm—Hane, Baxley & Spiecens

[57] ABSTRACT

A DC to DC converter which gives two individually controlled and stabilized DC voltages includes an oscillator of the push-pull type and two rectifiers which are connected to the output of the oscillator. The transformer of the oscillator has a primary winding which has been split up in two halves, the end of each half being connected to a controlling DC voltage. The secondary winding of the oscillator transformer has its one end connected to the two rectifiers. The output of each of the rectifiers is connected to one input of a regulating circuit, the output of which is connected to each of the primary winding halves for delivering the controlling DC voltage.

5 Claims, 10 Drawing Figures

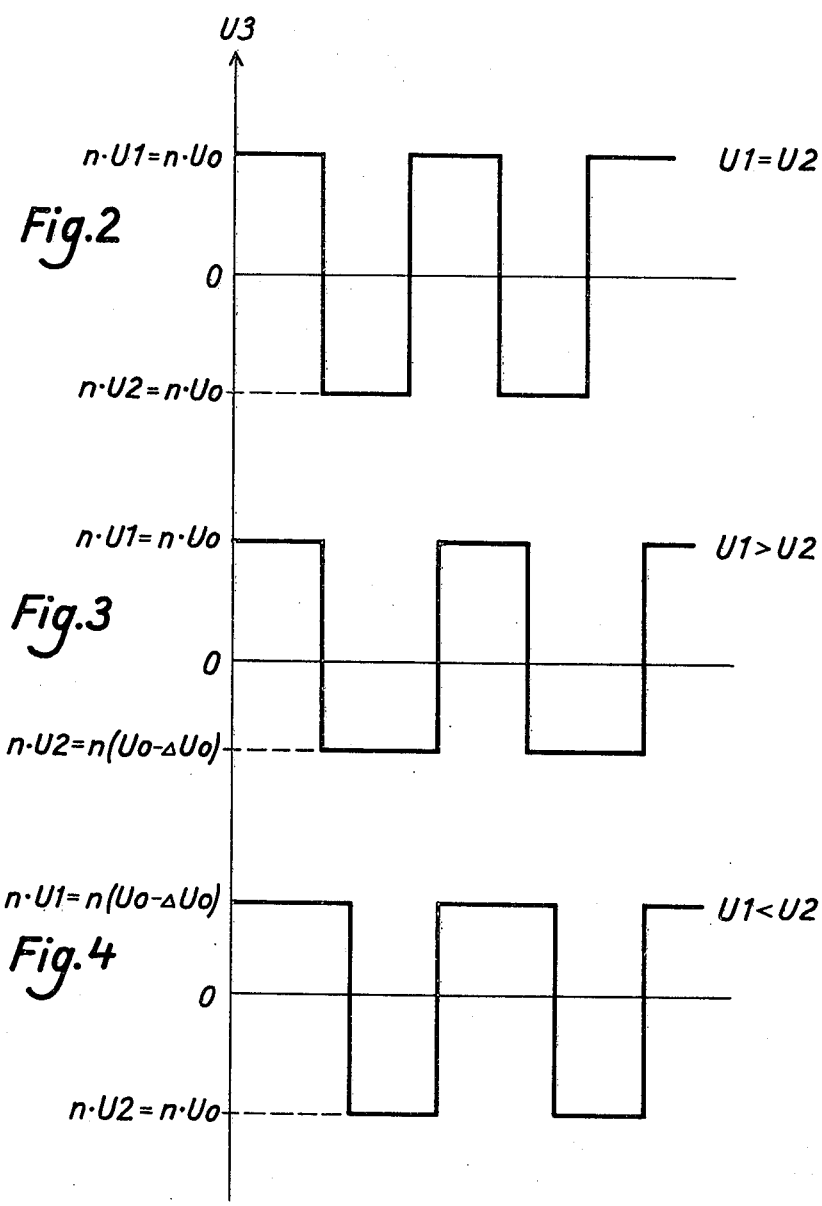

DC TO DC CONVERTER FOR PRODUCING TWO INDIVIDUALLY CONTROLLED AND STABILIZED DC-VOLTAGES

The present invention relates to a DC to DC converter for producing two individually controlled and stabilized voltages.

One field of application for converters of the mentioned kind is, for example, in voltage units for certain cathode-ray tubes, where there is a need for a constant acceleration voltage of the magnitude of 16 kV and a variable focusing voltage between 3 and 5 kV. These two voltages are then to be adjusted independently of each other and to be stabilized for eventual variations in the load connected to the converter.

Such voltage units can be realized by utilizing two separate converters of known kind. Each converter then consists of a square wave oscillator, a pulse amplifier, a transformer, a rectifier and a filter as described in, for example, the German patent 1,242,742. The period of the square wave voltage from the oscillator to the amplifier can be changed in dependence on the magnitude of the output voltage, whereby its value can be made independent of eventual load variations. Another way is to provide a further secondary winding and a rectifier-filter combination to the output transformer of the known converter, whereby in principle it would be possible to obtain two DC voltages, but these voltages could not in that case be controlled independently of each other. Thus, one is obliged to use two completely separate converters which implies higher costs.

An object of the present invention is to eliminate the mentioned drawbacks by providing a DC to DC converter from which two mutually independent stabilized DC voltages can be obtained wherein the converter contains only one transformer included in an oscillator arrangement.

The invention, the characteristics of which appear from the appended claims, will be closer described with reference to the accompanying drawings of which FIG. 1 shows a circuit diagram of an oscillator known per se which is included as part of the converter according to the present invention.

FIGS. 2 – 4 show the characteristics of the output voltage from the oscillator according to FIG. 1.

Figure 1:
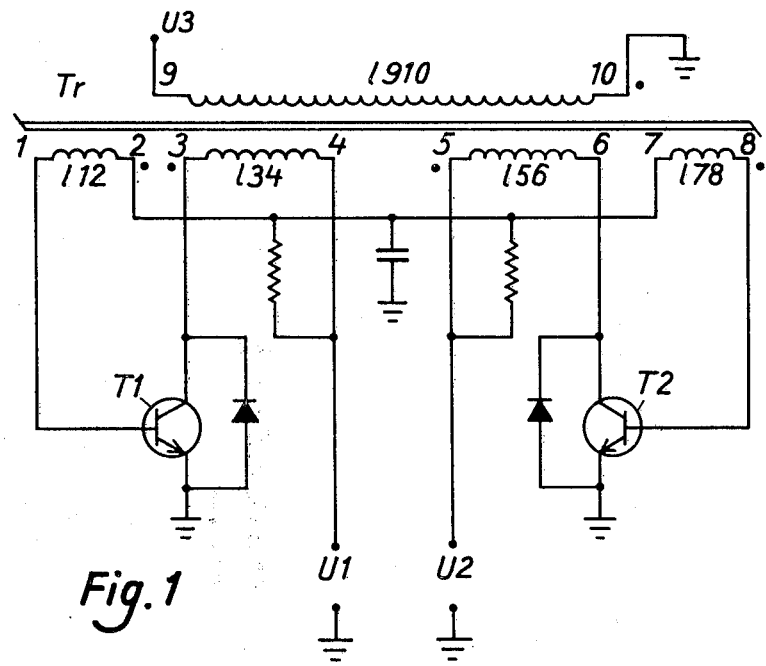

The oscillator according to FIG. 1 is included as an essential part in the converter according to the invention. This oscillator is designed and operates principally in accordance with a conventional inverter circuit with the exception that the midpoint of the included transformer Tr on the primary has been split up in two separate part windings 1 34 and 1 56. Each of its windings is connected to a DC voltage U1 and U2, respectively. The windings 1 12 and 1 78 form the two feed-back windings and each is connected to a power transistor T1 and T2, respectively in known manner. The transformer Tr has a secondary winding 1 910 one end point of which is grounded and across which the output voltage U3 appears. If the voltages U1 and U2 are equal, an output voltage is obtained which constitutes a symmetrical AC voltage having square wave form, c.f. FIG. 2.

If, on the contrary, the voltages U1 and U2 are not equal, an output voltage U3 is obtained which still has a square wave form, but the form differs from the symmetrical. In dependence on the magnitude of the DC voltages U1 and U2, the positive and the negative half period of the voltage U3, respectively have different time durations, but the output voltage still has square wave form, c.f. FIGS. 3 and 4. Independent of the value of the DC voltages U1 and U2 it follows that the time integral of the voltage during the positive half period is equal to the time integral of the voltage during the negative half period of the output voltage U3. From this it follows that in the case that the pulse time ratio differs from unity, the positive and the negative half period, respectively will obtain different amplitude values. The magnetic flux in the core of the transformer Tr is independent of the ratio between the values of the DC voltages U1 and U2, while the pulse time for the positive and negative period, respectively in the output voltage U3 is dependent on this ratio.

The two transistors T1 and T2 are conducting alternatingly during each part of the total period of the output voltage U3, for which reason the DC voltages U1 and U2 each are connected during its positive and negative part, respectively of the total period. With the polarity designations according to FIG. 1, it appears that during the positive half period the transistor T1 is conducting and the DC voltage U1 appears across the winding 1 34, while during the negative half period the transistor T2 is conducting and the DC voltage appears across the winding 1 56. If the voltage U1 is connected during the time Tp1 and the voltage U2 is connected during the time Tp2, then Lenz's law shows that $$Tp1 = \frac{2 \cdot n \cdot A \cdot Bmax}{U1} \text{ and } Tp2 = \frac{2 \cdot n \cdot A \cdot Bmax}{U2}$$

where n = the ratio of the transformer between windings 1 34, 1 56 and the winding 1 910, respectively, A = the area of the transformer core and Bmax = the maximal field strength in the core which is constant. Thus, Tp1 = K . 1/U1 and Tp2 = K . 1/U2, where K is a constant. By varying the level of the DC voltages U1 and U2, thus the amplitude of the positive and the negative half period, respectively of the output voltage U3 can be varied independently of each other. The pulse duration for the respective half period will then be inversely proportional to the respective DC voltage U1, U2.

Figure 5:
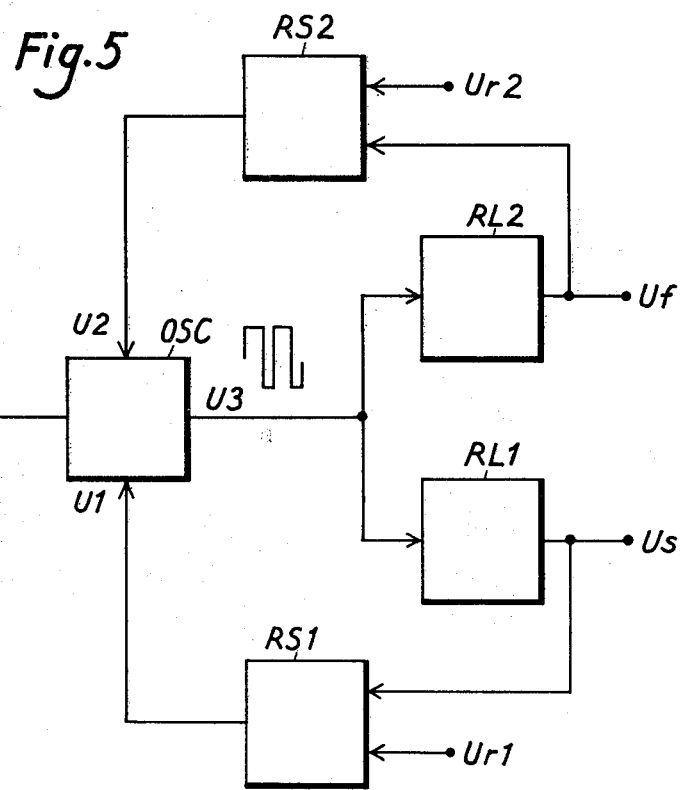
FIG. 5 shows a block diagram of the DC converter according to the present invention.

According to the inventive idea and in order to obtain two variable DC voltages, rectifier arrangements are connected to the output of the converter for rectifying the square wave formed output voltage U3. FIG. 5 shows a block diagram of the DC voltage converter according to the invention. The oscillator described above is indicated by OSC and to this the two DC voltages U1 and U2 are supplied in the manner shown in FIG. 1. To the oscillator OSC on the one hand a first rectifier arrangement RL1 and on the other hand a second rectifier arrangement RL2 are connected and the obtained rectified voltages are indicated by Us and Uf, respectively. According to the inventive idea, thus an oscillator known per se, the square wave formed output voltage of which can be controlled by means of two independent DC voltages is combined with two rectifier arrangements likewise known per se.

Different types of rectifier arrangements RL1, RL2 can be connected to the output of the oscillator OSC. According to one embodiment of the invention, half wave rectification of the output voltage U3 is carried out, the rectifier RL1 consisting of a half wave rectifier for the positive half wave of the output voltage U3 and the rectifier RL2 consisting of a half wave rectifier for the negative half wave in the output voltage U3. Thus the amplitude of the two rectified voltages Us and Uf can be varied by varying the DC voltages U1 and U2, respectively. According to another embodiment of the converter according to the invention the rectifier arrangement RL1 consist of a half wave rectifier and the rectifier arrangement RL2 consists of a peak-to-peak rectifier. Herewith an output voltage Uf is obtained which is proportional to the sum U1 + U2 of the two half periods in the output voltage U3. Furthermore, an output voltage Us is obtained which is proportional either to the voltage U1 or to the voltage U2 dependent on which of the two half periods in the output voltage U3 which has been selected for the half wave rectification. If the positive half wave is rectified, so that a voltage Us proportional to the voltage U1 is obtained, the peak-to-peak rectified voltage Uf (proportional to U1 + U2) can be varied by means of the voltage U2 without changing the half wave rectified voltage Uf (proportional to U1).

The obtained DC voltages Us and Uf are suitably supplied to one input of each of two regulators indicated by RS1 and RS2 in FIG. 5. The second input of the respective regulator is connected to a variable reference voltage Ur1 and Ur2, respectively the voltages by means of which the desired value of the output voltages Us and Uf, respectively can be adjusted. In, for example, the regulator RS1 a comparison is carried out between the values Ur1 and Us, the difference between these two values giving a positive or a negative contribution to the DC voltage U1. If, for example, the output voltage Us is somewhat greater than the reference voltage Ur1, a decrease of the voltage U1 takes place, so that the voltage Us assumes the desired value adjusted by means of the reference voltage Ur1. Each regulator RS1, RS2 can then consist of an integrating summing circuit of known kind.

Figure 6:
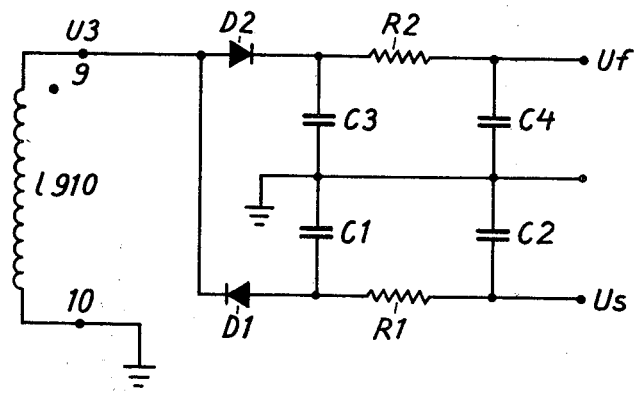
FIGS. 6 – 9 show different embodiments of the rectifiers included in the converter according to the present invention.
Figure 7:
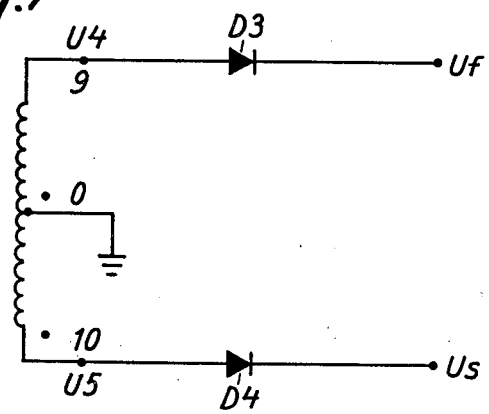
Figure 8:
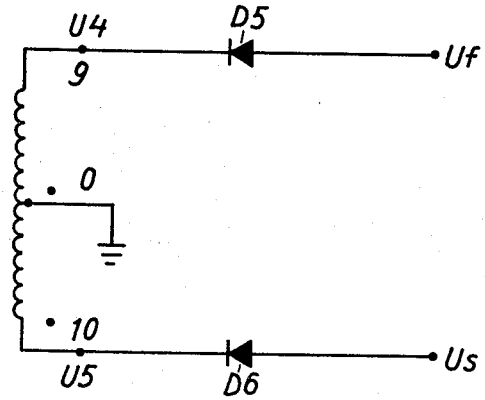

FIGS. 6, 7 and 8 show different embodiments of the rectifiers RL1, RL2 in the case when half wave rectification of the output voltage U3 from the oscillator OSC is carried out. FIG. 6 shows the secondary winding 1 910 included in the oscillator OSC, the terminal 10 then being grounded. The rectifier RL1 consists of a diode D1, the capacitors C1, C2 and a resistor R1. The rectifier RL2 consists of the diode D2, the capacitors C3, C4 and the resistor R2. The capacitor C1, C2 and C3, C4 and the resistors R1, R2 are all connected to ground. Hereby an output voltage Us from the half wave rectifier RL1 is obtained which is positive and constitutes the half wave rectified value of the positive pulse half in the voltage U3. Furthermore, the output voltage Uf is obtained which is negative and constitutes the half wave rectified value of the negative pulse half in the voltage U3.

FIG. 7 shows the case when two positive voltages can be obtained. The midpoint of the secondary winding 1 910 is then grounded, whereby two out-of-phase voltages U4 and U5 are obtained. The diode D3 is conducting for the positive half wave of the voltage U4, while the diode D4 is conducting for the negative half wave of the voltage U5.

FIG. 8 shows the case when two negative voltages can be obtained. Compared with FIG. 7 the two diodes D3 and D4 have been reversed.

Figure 9:
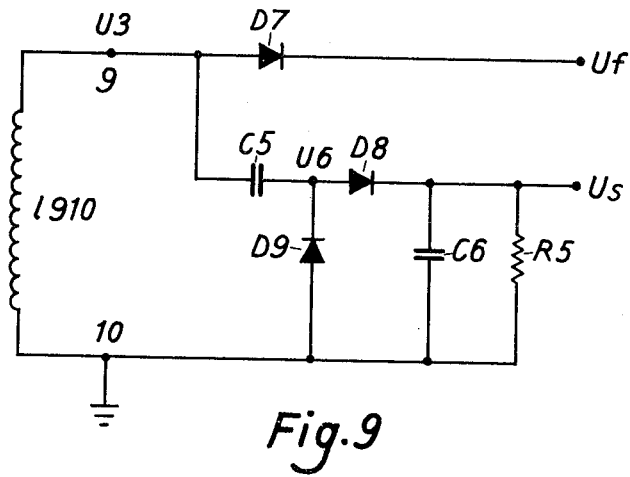
Figure 10:
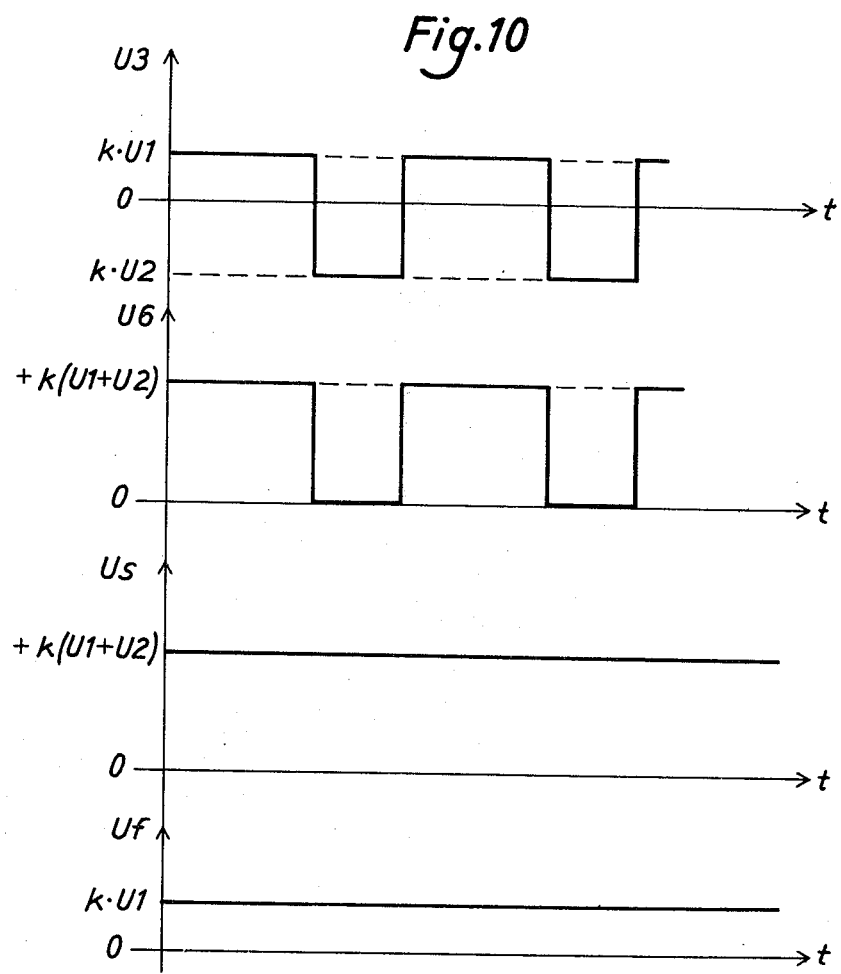
FIG. 10 shows wave forms of different voltages, which appear in the rectifier according to FIG. 9.

As previously mentioned, it is also possible to carry out a peak-to-peak rectification of the positive and the negative pulse halves of the secondary voltage U3 and a half wave rectification of one pulse half (for example, the positive) to obtain two mutually independent DC voltages. This is suitable in the case when a higher DC voltage is desired. As an example of this, reference is made to FIGS. 9 and 10 of which FIG. 9 shows the rectifier RL2 as a half wave rectifier and the rectifier RL1 as a peak-to-peak rectifier. FIG. 10 shows the wave forms which appear in the circuit according to FIG. 9. The rectifier RL2 consists of the diode D7 and the rectifier RL1 of the diodes D8, D9 the capacitors C5, C6 and the resistor R5. The output voltage Uf from the half wave rectifier RL2 constitutes a voltage which is proportional to the positive pulse half of the output voltage U3 and the output voltage Us from the peak-to-peak rectifier RL1 constitutes a positive voltage proportional to the sum of the absolute value of the positive and the negative pulse half, c.f. FIG. 10. Expressed in the control voltages U1 and U2 the following is valid $Uf = k \cdot U1$ and $Us = k \cdot (U1 + U2)$, where $k$ is a constant. The output voltage Uf can be varied by varying the reference voltage Ur2 to the regulator RS2 according to FIG. 5. If the voltage Ur2 is varied so that U1 decreases, this implies that also the voltage Uf decreases. However, herewith the value of the voltage Us = $k \cdot (U1 + U2)$ will also decrease. This new value of the voltage Us is compared in the regulator RS1 with the reference voltage Ur1 and the difference voltage is added to the control voltage U2 so that this voltage increases. Hereby also the voltage Us will increase to its original value. The regulation takes place automatically in the regulator RS1 and the output voltage Us is rapidly adjusted to its original value. In the case where the reference voltage is varied, whereby the output voltage Us is varied, the output voltage Uf will not be influenced according to what has been described above.

We claim:

1. A DC-to DC converter for producing two individually controlled and stabilized DC-voltages comprising:
    oscillator means having a first and second control terminal and an output terminal for producing a rectangular waveform with a controllable pulse ratio and controllable peak-to-peak amplitude;
    first and second rectifier means, each of said rectifier means having an input terminal and an output terminal, said input terminal being connected to the output terminal of said oscillator means for rectifying the rectangular waveform voltage from said output terminal;
    a first and a second variable voltage source;
    first and second regulator means for regulating the output voltage from each of said rectifier means, each of said regulator means having a first and a second input terminal and an output terminal, said first input terminals being connected to each of said first and second variable reference voltage source and said second input terminals being connected to each output of said first and second rectifier means for providing an error voltage which is dependent on the difference between the output voltage of the associated rectifier means and the associated reference voltage, said error voltage being added to said reference voltage in order to form an output voltage which is supplied to the first and second control terminal, respectively, of said oscillator means.

2. A DC to DC-converter according to claim 1, wherein said first and second rectifier means are half-wave rectifiers.

3. A DC to DC-converter according to claim 1, wherein said first rectifier means consists of a half-wave rectifier while the second rectifier means consists of a peak-to-peak rectifier.

4. A DC to DC-converter according to claim 1 wherein said regulator means is a summation means having two inputs and one output, where one input is connected to the output of one of said rectifier means while the other input is connected to a constant voltage and the output is connected to a control terminal of said oscillator means.

5. A DC to DC converter for producing two individually controlled and stabilized DC-voltages comprising:
   an oscillator arrangement of the push-pull type including a transformer having a primary winding which is split into two halves each having an end terminal and a secondary winding having an output terminal;
   a first and a second DC voltage;
   means for connecting said first and second DC voltage to the respective half of said primary winding for determining the amplitude of the two half waves appearing on the output of said secondary winding;
   first and second rectifier means each having an input terminal and an output terminal, said input terminal being connected to the output terminal of said secondary winding for rectifying the pulse formed output voltage on said output terminal;
   a first and a second variable reference voltage source, said first rectifier means being a half wave rectifier and said second rectifier means being a peak-to-peak rectifier; and
   first and second regulator means for providing said first and second DC voltage, each having a first and a second input terminal and an output terminal, said output terminal being connected to each of said end terminals of said primary winding halves, the first of said input terminals being connected to the output of each of said rectifier means, and said second input terminal being connected to one of said reference voltage sources.

* * * * *